United States Patent
Kimura et al.

(10) Patent No.: US 10,196,061 B2
(45) Date of Patent: Feb. 5, 2019

(54) CONTROL SYSTEM OF VEHICLE

(71) Applicant: TOYOTA JIDOSHA KABUSHIKI KAISHA, Toyota-shi (JP)

(72) Inventors: Kenta Kimura, Numazu (JP); Yoshio Ito, Susono (JP); Tomoaki Yanagida, Susono (JP); Yu Nagasato, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 308 days.

(21) Appl. No.: 15/184,665

(22) Filed: Jun. 16, 2016

(65) Prior Publication Data
US 2016/0368499 A1 Dec. 22, 2016

(30) Foreign Application Priority Data
Jun. 16, 2015 (JP) .................. 2015-121496

(51) Int. Cl.
*B60K 17/02* (2006.01)
*B60K 6/543* (2007.10)
(Continued)

(52) U.S. Cl.
CPC ....... *B60W 30/18072* (2013.01); *B60K 6/543* (2013.01); *B60K 17/02* (2013.01); *B60W 10/02* (2013.01); *B60W 10/06* (2013.01); *B60W 10/101* (2013.01); *B60W 10/107* (2013.01); *B60W 30/20* (2013.01); *B60W 2030/1809* (2013.01); *B60W 2510/1005* (2013.01); *B60W 2510/1015* (2013.01); *B60W 2520/10* (2013.01);
(Continued)

(58) Field of Classification Search
None
See application file for complete search history.

(56) References Cited

U.S. PATENT DOCUMENTS

| 8,932,182 B2* | 1/2015 | Tatewaki | ............. B60W 10/06 477/135 |
| 2012/0135841 A1* | 5/2012 | Watanabe | ........... B60W 10/026 477/115 |

(Continued)

FOREIGN PATENT DOCUMENTS

| CN | 104471269 A | 3/2015 |
| JP | 2012-112463 | 6/2012 |

(Continued)

*Primary Examiner* — Jacob S. Scott
(74) *Attorney, Agent, or Firm* — Oblon, McClelland, Maier & Neustadt, L.L.P.

(57) ABSTRACT

A control system of a vehicle includes an engine, a continuously variable transmission, drive wheels, a clutch, and an electronic control unit. The electronic control unit is configured to release the clutch and stop the engine when a predetermined execution condition is satisfied during traveling, such that the vehicle performs coasting. The electronic control unit is configured to keep the continuously variable transmission at a speed ratio established at start of the coasting, during the coasting of the vehicle. The electronic control unit is configured to restart the engine that has been stopped and perform downshift of the continuously variable transmission, when a predetermined return condition is satisfied during the coasting. The electronic control unit is configured to engage the clutch after the downshift is started, such that the vehicle returns from the coasting.

8 Claims, 11 Drawing Sheets

(51) Int. Cl.
  *B60W 10/02* (2006.01)
  *B60W 10/06* (2006.01)
  *B60W 30/18* (2012.01)
  *B60W 30/20* (2006.01)
  *B60W 10/101* (2012.01)
  *B60W 10/107* (2012.01)

(52) U.S. Cl.
  CPC ..... *B60W 2540/10* (2013.01); *B60W 2540/12* (2013.01); *B60W 2550/142* (2013.01); *B60W 2710/021* (2013.01); *B60W 2710/1005* (2013.01); *Y02T 10/48* (2013.01); *Y02T 10/76* (2013.01)

(56) References Cited

U.S. PATENT DOCUMENTS

2013/0150208 A1* 6/2013 Wakayama ........... B60W 10/06
                                                              477/68
2015/0166064 A1   6/2015 Mitsuyasu et al.
2016/0009273 A1   1/2016 Nagamine et al.
2018/0304892 A1* 10/2018 Tashiro ............... B60W 30/182

FOREIGN PATENT DOCUMENTS

| JP | 2012-149657 | 8/2012 |
| JP | 2015-117738 | 6/2015 |
| WO | WO 2013/190653 A1 | 12/2013 |
| WO | WO 2014/148376 A1 | 9/2014 |
| WO | WO2015/092518 | 6/2015 |
| WO | WO2015/151320 | 8/2015 |

\* cited by examiner

FIG. 3

| | | | C1 | C2 | B1 | S1 |
|---|---|---|---|---|---|---|
| NORMAL TIME | D | START (GEAR TRAIN) | ○ | × | × | ○ |
| | | MIDDLE SPEED (CVT) | × | ○ | × | ○ |
| | | HIGH SPEED (CVT) | × | ○ | × | × |
| | R | | × | × | ○ | ○ |
| | P·N | | × | × | × | ○ |
| FREE RUNNING (MIDDLE SPEED) | | | × | × | × | ○ |
| FREE RUNNING (HIGH SPEED) | | | × | × | × | × |

CONTROL SYSTEM OF VEHICLE

CROSS-REFERENCE TO RELATED APPLICATIONS

The disclosure of Japanese Patent Application No. 2015-121496 filed on Jun. 16, 2015 including the specification, drawings and abstract is incorporated herein by reference in its entirety.

BACKGROUND

1. Field

The disclosure relates to a control system of a vehicle.

2. Description of Related Art

A vehicle control system is known which releases a clutch during traveling, so that the vehicle travels in a coasting mode, in a condition where power cannot be transmitted between an engine and drive wheels. The clutch may be called "engine-disconnecting clutch".

In Japanese Patent Application Publication No. 2012-149657 (JP 2012-149657 A), a vehicle in which the engine-disconnecting clutch is provided upstream of a continuously variable transmission is described. A control system of this vehicle is configured to shift up the continuously variable transmission, based on a road gradient, during traveling in the coasting mode in which the clutch is released.

SUMMARY OF THE DISCLOSURE

The engine-disconnecting clutch may be provided downstream of the continuously variable transmission, namely, between the continuously variable transmission and drive wheels. When the clutch disposed downstream of the continuously variable transmission is released, and the engine is stopped, the vehicle travels in the coasting mode. During coasting, rotation of the continuously variable transmission is stopped. If rotation of the continuously variable transmission is stopped, the input shaft speed and output shaft speed of the continuously variable transmission become equal to zero, and the speed ratio cannot be detected. Furthermore, the speed ratio of the continuously variable transmission cannot be changed. Therefore, during coasting, the continuously variable transmission is supposed to be kept in a condition at the time when coasting is started. However, in the case where the vehicle starts coasting at a high vehicle speed, and returns from coasting to normal traveling at a low vehicle speed, if the clutch is engaged at the time of return, in a condition where the speed ratio of the continuously variable transmission is kept at the speed ratio established at the time when coasting was started, the engine speed may become lower than a rotational speed range of normal traveling. Namely, when the vehicle returns from coasting, excessively large noise and vibration (NV) or engine stall may occur. As a result, the driver may feel strange or uncomfortable.

The disclosure provides a vehicle control system that makes it less likely or unlikely for the driver to feel strange or uncomfortable, when the vehicle returns from a coasting mode to a normal traveling mode.

A control system of a vehicle according to one aspect of the disclosure includes an engine, a continuously variable transmission, drive wheels, a clutch, and an electronic control unit. The drive wheels receive drive power from the engine via a power transmission path that extends through the continuously variable transmission. The clutch is provided between the continuously variable transmission and the drive wheels in the power transmission path. The electronic control unit is configured to release the clutch and stop the engine when a predetermined execution condition is satisfied during traveling, such that the vehicle performs coasting. The electronic control unit is configured to keep the continuously variable transmission at a speed ratio established at start of the coasting, during the coasting of the vehicle. The electronic control unit is configured to restart the engine that has been stopped and perform downshift of the continuously variable transmission, when a predetermined return condition is satisfied during the coasting. The electronic control unit is configured to engage the clutch after the downshift is started, such that the vehicle returns from the coasting.

The control system of the vehicle according to the above aspect of the disclosure performs downshift of the continuously variable transmission before engaging the clutch, when the vehicle returns from coasting. Thus, reduction of the engine speed can be curbed when the clutch is engaged.

In the control system of the vehicle according to the above aspect of the disclosure, the electronic control unit may be configured to shift the continuously variable transmission, based on a shift map using a vehicle speed and an input shaft speed of the continuously variable transmission as parameters. The electronic control unit may be configured to set a speed ratio at which the input shaft speed is larger than a predetermined value at the vehicle speed detected when the return condition is satisfied, as a target speed ratio, based on the vehicle speed detected when the return condition is satisfied, and the shift map. The electronic control unit may be configured to perform the downshift so as to increase the speed ratio of the continuously variable transmission toward the target speed ratio.

According to the control system of the vehicle as described above, the speed ratio at which the input shaft speed is larger than the predetermined value at the vehicle speed at the time when the return condition is satisfied is set as the target speed ratio. Since the continuously variable transmission is shifted down toward the target speed ratio, reduction of the engine speed can be curbed when the clutch is engaged.

In the control system of the vehicle as described above, the return condition may include a case where an accelerator pedal is depressed, and a case where a brake pedal is depressed. The electronic control unit may be configured to set the target speed ratio, such that the target speed ratio in the case where the accelerator pedal is depressed is smaller than the target speed ratio in the case where the brake pedal is depressed.

According to the control system of the vehicle as described above, since an acceleration request is made when the accelerator pedal is depressed, the target speed ratio is set to a relatively small value, and the input shaft speed as a target value is set to a relatively low value, so that the amount of increase of the engine speed to the target value during downshift can be reduced, and the length of time required until the clutch is engaged can be reduced. The input shaft speed as the target value is included within a rotational speed range in which no problem arises from noise and vibration, and engine stall. Thus, when the vehicle returns from coasting, the response can be improved, and deterioration of noise and vibration and engine stall can be suppressed, so that the driver is less likely or unlikely to feel strange or uncomfortable. Also, when the brake pedal is depressed, the rotational speed of the drive wheels is reduced; therefore, the target speed ratio is set to a relatively large value, and the input shaft speed as the target value is set to a relatively high speed, so that deterioration of noise and vibration and occurrence of engine stall can be curbed.

In the control system of the vehicle as described above, the electronic control unit may be configured to engage the clutch, when a difference between the speed ratio of the continuously variable transmission which is increased due to the downshift, and the target speed ratio, is equal to or smaller than a predetermined threshold value.

According to the control system of the vehicle as described above, the continuously variable transmission is shifted down while the clutch is released; therefore, if the difference between the speed ratio of the continuously variable transmission and the target speed ratio is reduced, a difference between the rotational speeds of engaging elements of the clutch is reduced. Namely, when the difference between the target speed ratio and the actual speed ratio is equal to or smaller than the predetermined threshold value, the rotational speeds of the engaging elements of the clutch that is being released are close to the synchronous speed. Accordingly, when the vehicle returns from coasting, the clutch can be engaged in a condition where the rotational speeds are substantially equal to each other.

In the control system of the vehicle according to the above aspect of the disclosure, the electronic control unit may be configured to start the downshift, after the engine that is restarted is brought into a self-operating state.

According to the control system of the vehicle as described above, the downshift of the continuously variable transmission is started after the engine is brought into the self-operating or self-rotating state, so that the shifting operation can be smoothly started. Thus, the shift response at the time of return from coasting can be improved.

In the control system of the vehicle according to the above aspect of the disclosure, the clutch may include a hydraulic actuator. The hydraulic actuator may be configured to frictionally engage engaging elements of the clutch. The electronic control unit may be configured to control a hydraulic pressure of the hydraulic actuator, during downshift of the continuously variable transmission, such that the hydraulic pressure becomes equal to a pressure level that is higher than zero, and is within a range in which the clutch does not produce a transmission torque capacity.

According to the control system of the vehicle as described above, the gap between the engaging elements of the clutch is reduced during downshift control, so that the response at the time of clutch engagement is improved. Thus, the response at the time of return from coasting can be improved.

According to the control system of the vehicle according to the above aspect of the disclosure, when the vehicle returns from the coasting mode in which the clutch is released and the engine is stopped, the engine is restarted and the continuously variable transmission is shifted down, before the clutch is engaged. With this arrangement, when the vehicle returns from coasting to normal traveling, reduction of the engine speed can be curbed, so that the driver is less likely or unlikely to feel strange or uncomfortable.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is an engagement table indicating engagement states in each of traveling modes;

DETAILED DESCRIPTION OF EMBODIMENTS

Figure 1:
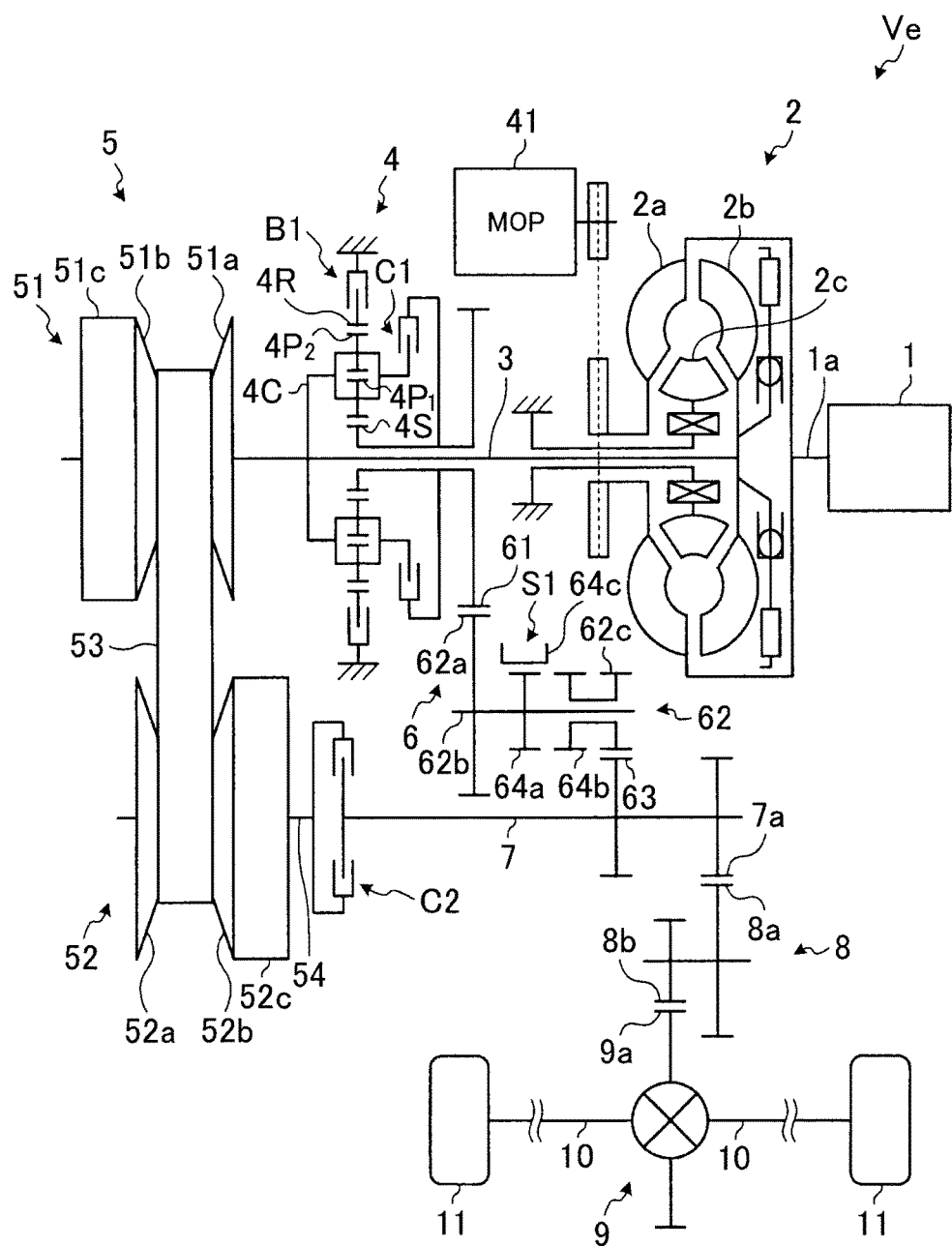
FIG. 1 is a skeleton diagram schematically showing a vehicle in which a control system as one embodiment of the disclosure is used.

Referring to the drawings, a vehicle control system according to one embodiment of the disclosure will be specifically described.

FIG. 1 is a skeleton diagram showing one example of a vehicle that is controlled by the vehicle control system of this embodiment. The vehicle Ve includes an engine 1 as a power source. The power generated from the engine 1 is transmitted to drive wheels 11, via a torque converter 2 as a hydraulic transmission device, an input shaft 3, a forward/reverse switching mechanism 4, a belt-type continuously variable transmission (which will be called "CVT") 5 or a gear train 6, an output shaft 7, a counter gear mechanism 8, a differential gear unit 9, and axles 10. A second clutch C2 as a clutch for disconnecting the engine 1 from the drive wheels 11 is provided downstream of the CVT 5. When the second clutch C2 is released, torque cannot be transmitted between the CVT 5 and the output shaft 7, and the CVT 5 as well as the engine 1 is disconnected from the drive wheels 11.

More specifically, the torque converter 2 includes a pump impeller 2a coupled to the engine 1, a turbine runner 2b that is opposed to the pump impeller 2a, and a stator 2c disposed between the pump impeller 2a and the turbine runner 2b. The interior of the torque converter 2 is filled with a working fluid (oil). The pump impeller 2a rotates as a unit with a crankshaft 1a of the engine 1. The input shaft 3 is coupled to the turbine runner 2b so as to rotate as a unit with the turbine runner 2b. The torque converter 2 includes a lock-up clutch. When the lock-up clutch is in an engaged state, the pump impeller 2a and the turbine runner 2b rotate as a unit. When the lock-up clutch is in a released state, the power generated from the engine 1 is transmitted to the turbine runner 2b via the working fluid. The stator 2c is held by a fixed part, such as a case, via a one-way clutch.

Also, a mechanical oil pump (MOP) 41 is connected to the pump impeller 2a, via a transmission mechanism, such as a belt mechanism. The mechanical oil pump 41, which is connected to the crankshaft 1a via the pump impeller 2a, is adapted to be driven by the engine 1. The mechanical oil pump 41 and the pump impeller 2a may be arranged to rotate as a unit.

The input shaft 3 is coupled to the forward/reverse switching mechanism 4. When the forward/reverse switching mechanism 4 transmits engine torque to the drive wheels 11, it switches the direction of torque applied to the drive wheels 11 between the forward direction and the reverse direction. The forward/reverse switching mechanism 4, which is a differential mechanism, is in the form of a double-pinion type planetary gear mechanism in the example shown in FIG. 1. The forward/reverse switching mechanism 4 includes a sun gear 4S, a ring gear 4R disposed concentrically with the sun gear 4S, a first pinion gear $4P_1$ that meshes with the sun gear 4S, a second pinion gear $4P_2$ that meshes with the first pinion gear $4P_1$ and the ring gear 4R, and a carrier 4C that holds the pinion gears $4P_1$, $4P_2$, such that each of the pinion gears $4P_1$, $4P_2$ can rotate about itself and about the axis of the mechanism 4. A drive gear 61 of the gear train 6 is coupled to the sun gear 4S such that the drive gear 61 rotates as a unit with the sun gear 4S. The input shaft 3 is coupled to the carrier 4C such that the input shaft 3 rotates as a unit with the carrier 4C. Also, a first clutch C1 is provided for selectively rotating the sun gear 4S and the carrier 4C as a unit. When the first clutch C1 is engaged, the whole of the forward/reverse switching mechanism 4 rotates as a unit. Further, a brake B1 is provided for selectively fixing the ring gear 4R so as to inhibit the ring gear 4R from rotating. The first clutch C1 and the brake B1 are hydraulic devices.

If the first clutch C1 is engaged, and the brake B1 is released, for example, the sun gear 4S and the carrier 4C rotate as a unit. Namely, the input shaft 3 and the drive gear 61 rotate as a unit. If the first clutch C1 is released, and the brake B1 is engaged, the sun gear 4S and the carrier 4C rotate in opposite directions. Namely, the input shaft 3 and the drive gear 61 rotate in opposite directions.

In the vehicle Ve, the CVT 5 as a stepless speed change part, and the gear train 6 as a stepped speed change part, are provided in parallel with each other. As power transmission paths between the input shaft 3 and the output shaft 7, a power transmission path (which will be called "first path") that extends through the CVT 5, and a power transmission path (which will be called "second path") that extends through the gear train 6 are formed in parallel with each other.

The CVT 5 includes a primary pulley 51 that rotates as a unit with the input shaft 3, a secondary pulley 52 that rotates as a unit with a secondary shaft 54, and a belt 53 that is wrapped around V grooves formed in the pair of pulleys 51, 52. The input shaft 3 serves as a primary shaft. With the V-groove width of each of the pulleys 51, 52 changed, the engaging radii of the belt 53 are changed, so that the speed ratio $\gamma$ of the CVT 5 can be continuously changed. The speed ratio $\gamma$ of the CVT 5 continuously varies within a range from the maximum speed ratio $\gamma_{max}$ (the lowest gear) to the minimum speed ratio $\gamma_{min}$ (the highest gear).

The primary pulley 51 includes a fixed sheave 51a formed integrally with the input shaft 3, a movable sheave 51b that can move in the axial direction on the input shaft 3, and a primary hydraulic cylinder 51c that applies thrust to the movable sheave 51b. A sheave face of the fixed sheave 51a and a sheave face of the movable sheave 51b are opposed to each other, so as to form the V groove of the primary pulley 51. The primary hydraulic cylinder 51c is located on the back side of the movable sheave 51b. The hydraulic pressure (which will be called "primary pressure") $P_{in}$ in the primary hydraulic cylinder 51c produces thrust for moving the movable sheave 51b toward the fixed sheave 51a.

The secondary pulley 52 includes a fixed sheave 52a formed integrally with the secondary shaft 54, a movable sheave 52b that can move in the axial direction on the secondary shaft 54, and a secondary hydraulic cylinder 52c that applies thrust to the movable sheave 52b. A sheave face of the fixed sheave 52a and a sheave face of the movable sheave 52b are opposed to each other, so as to form the V groove of the secondary pulley 52. The secondary hydraulic cylinder 52c is located on the back side of the movable sheave 52b. The hydraulic pressure (which will be called "secondary pressure") $P_{out}$ in the secondary hydraulic cylinder 52c produces thrust for moving the movable sheave 52b toward the fixed sheave 52a.

The second clutch C2 is provided between the secondary shaft 54 and the output shaft 7, and is operable to selectively disconnect the CVT 5 from the output shaft 7. If the second clutch C2 is engaged, for example, the CVT 5 and the output shaft 7 are connected to each other such that power can be transmitted therebetween, and the secondary shaft 54 and the output shaft 7 rotate as a unit. If the second clutch C2 is released, the secondary shaft 54 and the output shaft 7 are disconnected from each other such that torque cannot be transmitted therebetween, and the engine 1 and the CVT 5 are disconnected from the drive wheels 11. The second clutch C2 is a hydraulic device. Engaging elements of the second clutch C2 are arranged to be frictionally engaged with each other by means of a hydraulic actuator.

An output gear 7a and a driven gear 63 are mounted on the output shaft 7 such that the gears 7a, 63 rotate as a unit with the shaft 7. The output gear 7a meshes with a counter driven gear 8a of the counter gear mechanism 8 as a speed reduction mechanism. A counter drive gear 8b of the counter gear mechanism 8 meshes with a ring gear 9a of the differential gear unit 9. The right and left drive wheels 11, 11 are connected to the differential gear unit 9, via right and left axles 10, 10, respectively.

The gear train 6 includes the drive gear 61 that rotates as a unit with the sun gear 4S of the forward/reverse switching mechanism 4, and the driven gear 63 that rotates as a unit with the output shaft 7. The gear train 6 is a speed reduction mechanism, and the speed ratio (gear ratio) of the gear train 6 is set to a predetermined value that is larger than the maximum speed ratio $\gamma_{max}$ of the CVT 5. The speed ratio of the gear train 6 is a fixed speed ratio. When the vehicle Ve is started, torque is transmitted from the engine 1 to the drive wheels 11 via the gear train 6. The gear train 6 functions as a start gear.

The drive gear 61 meshes with the counter driven gear 62a of the counter gear mechanism 62. The counter gear mechanism 62 includes the counter driven gear 62a, a counter shaft 62b, and a counter drive gear 62c that meshes with the driven gear 63. The counter driven gear 62a is mounted on the counter shaft 62b so as to rotate as a unit with the shaft 62b. The counter shaft 62b is disposed in parallel with the input shaft 3 and the output shaft 7. The counter drive gear 62c is arranged to be able to rotate relative to the counter shaft 62b. Also, a meshing-type engaging device (which will be called "dog clutch") S1 is provided for selectively rotating the counter shaft 62b and the counter drive gear 62c as a unit.

The dog clutch S1 includes a pair of engaging elements 64a, 64b of meshing type, and a sleeve 64c that can move in the axial direction. The first engaging element 64a is a hub that is splined to the counter shaft 62b. The first engaging element 64a and the counter shaft 62b rotate as a unit. The second engaging element 64b is coupled to the counter drive gear 62c so as to rotate as a unit with the gear 62c. Namely, the second engaging element 64b rotates relative to the counter shaft 62b. When spline teeth formed on the inner circumferential surface of the sleeve 64c are brought into meshing engagement with spline teeth formed on the outer circumferential surfaces of the engaging elements 64a, 64b, the dog clutch S1 is placed in an engaged state. With the dog clutch S1 thus engaged, the drive gear 61 and the driven gear 63 are connected to each other such that torque can be transmitted between the gears 61, 63 (via the second path). When the second engaging element 64b and the sleeve 64c are disengaged from each other, the dog clutch S1 is placed in a released state. With the dog clutch S1 thus released, the drive gear 61 and the driven gear 63 are disconnected from each other such that torque cannot be transmitted between the gears 61, 63 (via the second path). The dog clutch S1 is a hydraulic clutch, and the sleeve 64c is moved in the axial direction, by means of a hydraulic actuator.

Figure 2:
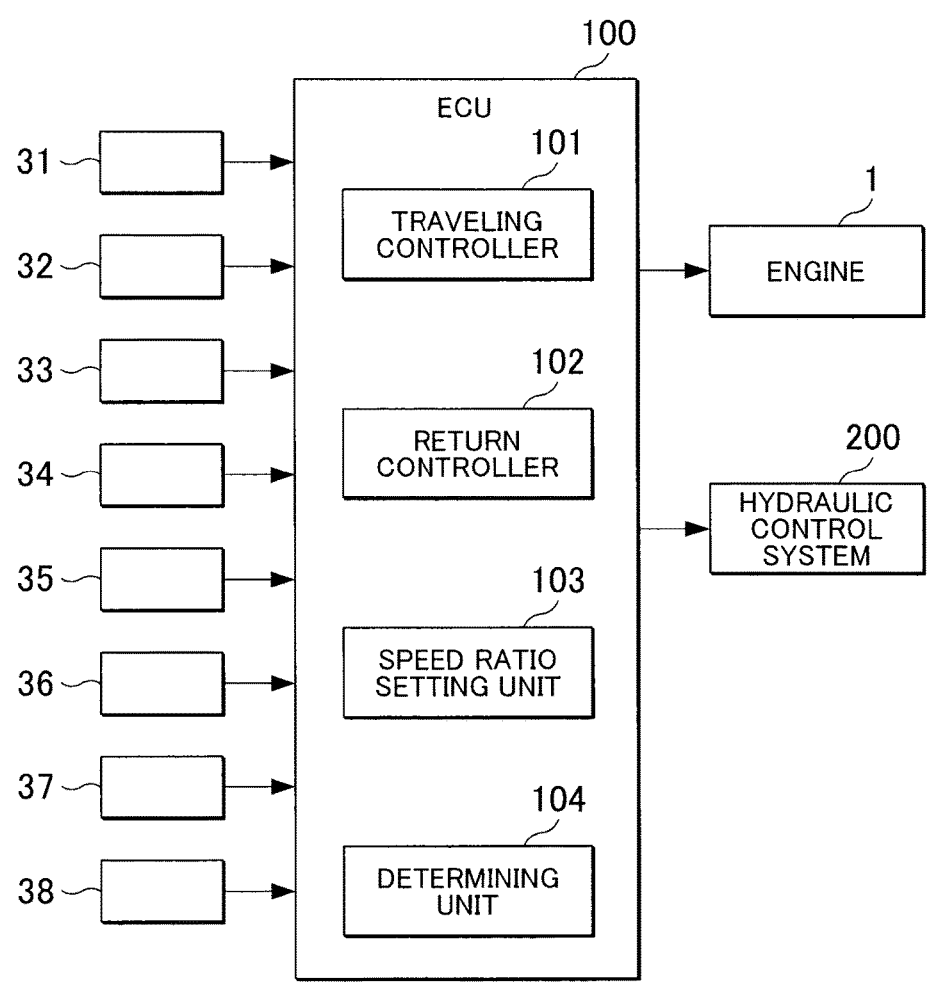
FIG. 2 is a functional block diagram showing one example of the vehicle control system.

FIG. 2 is a functional block diagram schematically showing the vehicle control system of this embodiment. The vehicle control system includes an electronic control unit (which will be called "ECU") 100 that controls the vehicle Ve. The ECU 10, which is mainly constituted by a microcomputer, performs computations using input data and data stored in advance, and outputs the results of computations as command signals.

The ECU 100 receives signals from various sensors 31-38. A vehicle speed sensor 31 detects the vehicle speed V. An input shaft speed sensor 32 detects the rotational speed (which will be called "input shaft speed") $N_{in}$ of the input shaft 3. Since the input shaft 3 and the turbine runner 2b rotate as a unit, the input shaft speed sensor 32 may be said to detect the rotational speed (which will be called "turbine speed") $N_t$ of the turbine runner 2b. The input shaft speed $N_{in}$ is equal to the turbine speed $N_t$. A first output shaft speed sensor 33 detects the rotational speed (which will be called "first output shaft speed") $N_{out1}$ of the secondary shaft 54. A second output shaft speed sensor 34 detects the rotational speed (which will be called "second output shaft speed") $N_{out2}$ of the output shaft 7. The rotational speed detected at a point upstream of the second clutch C2 is the first output shaft speed $N_{out1}$, and the rotational speed detected at a point downstream of the second clutch C2 is the second output shaft speed $N_{out2}$. An engine speed sensor 35 detects the rotational speed (which will be called "engine speed") $N_e$ of the crankshaft 1a. An accelerator pedal position sensor 36 detects the operation amount of an accelerator pedal (not shown). A brake stroke sensor 37 detects the operation amount of a brake pedal (not shown). A shift position sensor 38 detects the position of a shift lever (not shown). The ECU 100 can also detect (calculate) the speed ratio $\gamma$ (=$N_{in}/N_{out1}$) of the CVT 5 by dividing the input shaft speed $N_{in}$ by the first output shaft speed $N_{out1}$, during rotation of the CVT 5.

The ECU 100 includes a traveling controller 101, a return controller 102, a speed ratio setting unit 103, and a determining unit 104.

The traveling controller 101 controls the vehicle Ve in a selected one of two or more traveling modes. One example of the traveling modes is a free-running mode. In the free-running mode, the second clutch C2 as a clutch for disconnecting the engine is released, and the engine 1 is automatically stopped, so as to permit the vehicle Ve to coast, i.e., travel by inertia. The ECU 100 performs free-running control when a given execution condition is satisfied, so as to shift the vehicle Ve from normal traveling to free running. Also, when a given return condition is satisfied during free running, the return controller 102 performs control (return control) for returning the vehicle Ve from free running to normal traveling. By returning to normal traveling, the vehicle Ve is able to travel with power generated by the engine 1. The speed ratio setting unit 103 sets the speed ratio $\gamma$ of the CVT 5. The determining unit 104 determines whether the execution condition or the return condition is satisfied.

The ECU 100 outputs a command signal to the engine 1, so as to control the fuel supply amount, intake air amount, fuel injection, ignition timing, and so forth. The ECU 100 also outputs a hydraulic command signal to a hydraulic control system 200, so as to control shifting operation of the CVT 5, and operation of the respective engaging devices, such as the first clutch C1. The hydraulic control system 200 supplies hydraulic pressures to the respective hydraulic cylinders 51c, 52c of the CVT 5, and hydraulic actuators of the respective engaging devices C1, C2, B1, S1. By controlling the hydraulic control system 200, the ECU 100 performs control for switching the power transmission path between the first path and the second path, shift control of the CVT 5, control for switching the vehicle among various traveling modes, and so forth.

FIG. 3 is an engagement table indicating various traveling modes. In FIG. 3, "O" denotes an engaged state, and "×" denotes a released state, as an operating state of the engaging device in question. Regarding the positions of the shift lever, "D" denotes the drive position, "R" denotes the reverse position, "P" denotes the parking position, and "N" denotes the neutral position.

The traveling modes are divided into those of normal time, and those of free running. Normal traveling (D) includes three traveling modes, i.e., starting, middle-speed and high-speed modes. When the vehicle is started, the first clutch C1 and the dog clutch S1 are engaged, and the second clutch C2 and the brake B1 are released. The power transmission path during starting is set to the second path that extends through the gear train 6. When the vehicle speed V increases to some extent after starting, clutch changeover control for releasing the first clutch C1 and engaging the second clutch C2 is performed, so that the traveling mode shifts from the starting mode to the middle-speed mode. In the middle-speed mode, the second clutch C2 and the dog clutch S1 are engaged, and the first clutch C1 and the brake B1 are released. The power transmission path during middle-speed traveling is set to the first path that extends through the CVT 5. Namely, during transition from the starting mode to the middle-speed mode, the power transmission path switches from the second path to the first path. The changeover control of the first clutch C1 and the second clutch C2 is clutch-to-clutch control for gradually changing the transmission torque capacity. If the vehicle speed V further increases during middle-speed traveling, the dog clutch S1 is released, so that the traveling mode shifts from the middle-speed mode to the high-speed mode. In the high-speed mode, the second clutch C2 is engaged, and the first clutch C1, brake B1, and the dog clutch S1 are released. During transition from the middle-speed mode to the high-speed mode, no switching of the paths is performed, and the power transmission path remains the first path.

When the vehicle Ve is in a reverse drive mode (R), the brake B1 and the dog clutch S1 are engaged, and the first clutch C1 and the second clutch C2 are released, so that the power transmission path is set to the second path that extends through the gear train 6. When the shift position is "N" or "P", the dog clutch S1 is engaged, and the first clutch C1, second clutch C2, and the brake B1 are released.

The free running includes a middle-speed mode and a high-speed mode. In the free-running middle-speed mode, the dog clutch S1 is engaged, and the first clutch C1, second clutch C2, and the brake B1 are released. In the free-running high-speed mode, the first clutch C1, second clutch C2, brake B1 and the dog clutch S1 are released. The power transmission path during free running is set to the first path. For example, transition from normal traveling to free running includes transition from the normal-time (D) middle-speed mode to the free-running middle-speed mode, and transition from the normal-time (D) high-speed mode to the free-running high-speed mode. If the second clutch C2 is released during traveling in the normal middle-speed mode (D), the traveling mode shifts to the free-running middle-speed mode. If the second clutch C2 is released during traveling in the normal high-speed mode (D), the traveling mode shifts to the free-running high-speed mode. When the vehicle returns from free running to normal traveling, the second clutch C2 is engaged. If the second clutch C2 is engaged during traveling in the free-running middle-speed mode, the vehicle returns to the normal middle-speed mode (D). If the second clutch C2 is engaged during traveling in the free-running high-speed mode, the vehicle returns to the normal high-speed mode (D).

Figure 4:
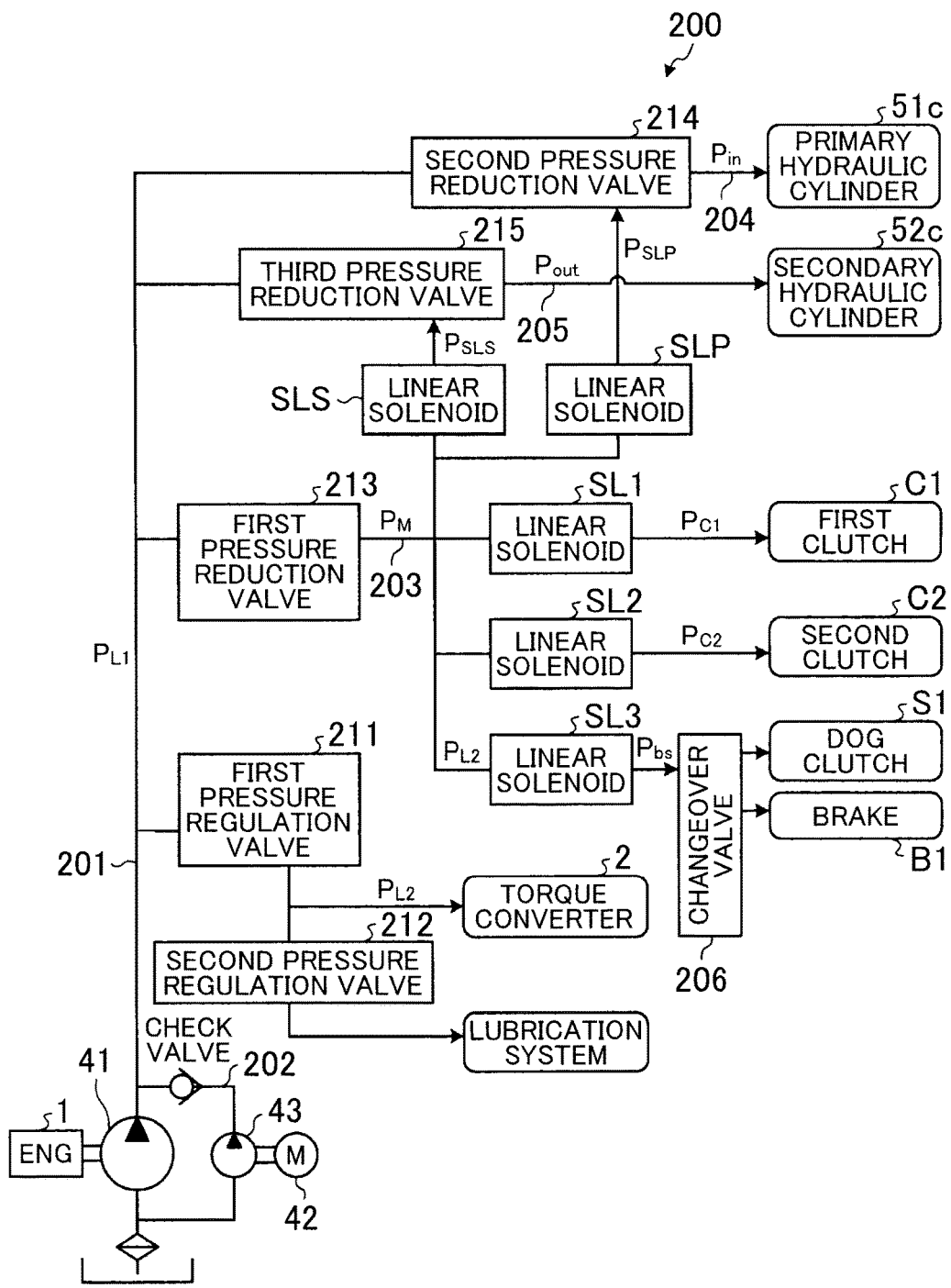
FIG. 4 is a hydraulic circuit diagram showing one example of a hydraulic control system.

FIG. 4 is a hydraulic circuit diagram showing one example of the hydraulic control system 200. The hydraulic control system 200 includes, as hydraulic supply sources, the mechanical oil pump 41 driven by the engine 1, and an electric oil pump 43 driven by an electric motor (M) 42. A battery (not shown) is electrically connected to the electric motor 42. Each of the pumps 41, 43 sucks oil stored in an oil pan, and feeds the oil under pressure to a first oil passage 201. The oil delivered from the electric oil pump 43 is supplied to the first oil passage 201 via a second oil passage 202. The first oil passage 201 and the second oil passage 202 are connected via a check valve. When the hydraulic pressure of the first oil passage 201 is higher than that of the second oil passage 202, the check valve closes. When the hydraulic pressure of the first oil passage 201 is lower than that of the second oil passage 202, the check valve opens. During free running, for example, the engine 1 is stopped, and the mechanical oil pump 41 cannot be driven; therefore, the electric oil pump 43 is driven so that pressurized oil is supplied to the first oil passage 201.

The hydraulic control system 200 includes a first pressure regulation valve 211 that regulates the hydraulic pressure of the first oil passage 201 to a first line pressure $P_{L1}$, a second pressure regulation valve 212 that regulates the pressure of the oil discharged from the first pressure regulation valve 211 to a second line pressure $P_{L2}$, a first pressure reduction valve (modulator valve) 213 that regulates the first line pressure $P_{L1}$ as an original pressure to a given modulator pressure $P_M$, a second pressure reduction valve (speed ratio control valve) 214 that regulates the first line pressure $P_{L1}$ as an original pressure to the primary pressure $P_{in}$, and a third pressure reduction valve (clamping force control valve) 215 that regulates the first line pressure $P_{L1}$ as an original pressure to the secondary pressure $P_{out}$. The first pressure regulation valve 211 is controlled, based on a control pressure generated from a linear solenoid valve (not shown), so as to produce the first line pressure $P_{L1}$ commensurate with traveling conditions. The oil whose pressure is regulated to the second line pressure $P_{L2}$ by the second pressure regulation valve 212 is supplied to the torque converter 2. The oil discharged from the second pressure regulation valve 212 is supplied to a lubrication system including meshing parts of gears.

A plurality of linear solenoid valves SL1, SL2, SL3, SLP, SLS are connected to the first pressure reduction valve 213, via a third oil passage 203. Each of the linear solenoid valves SL1, SL2, SL3, SLP, SLS is controlled by the ECU 100 in terms of its energization, non-energization and current, independently of each other, so as to regulate the hydraulic pressure according to a hydraulic command signal.

The linear solenoid valve SL1 regulates the modulator pressure $P_M$ to a first clutch pressure $P_{C1}$ according to a hydraulic command signal, and supplies the pressure $P_{C1}$ to the first clutch C1. The linear solenoid valve SL2 regulates the modulator pressure $P_M$ to a second clutch pressure $P_{C2}$ according to a hydraulic command signal, and supplies the pressure $P_{C2}$ to the second clutch C2. The linear solenoid valve SL3 regulates the modulator pressure $P_M$ to a supply hydraulic pressure $P_{bs}$ according to a hydraulic command signal, and supplies the pressure $P_{bs}$ to the dog clutch S1 and the brake B1. The linear solenoid valve SL3 is connected to the dog clutch S1 and the brake B1, via a changeover valve 206. The changeover valve 206 mechanically or electrically operates, based on operation of the shift lever, to change the oil passages. When the shift lever is in the "D" position, the supply hydraulic pressure $P_{bs}$ is supplied to the dog clutch S1. When the shift lever is in the "R" position, the supply hydraulic pressure $P_{bs}$ is supplied to the dog clutch S1 and the brake B1. When the shift lever is in the "P" or "N" position, the supply oil pressure $P_{bs}$ is supplied to the dog clutch S1.

The linear solenoid valve SLP regulates the modulator pressure $P_M$ as an original pressure, to a signal pressure $P_{SLP}$, and delivers the signal pressure $P_{SLP}$ to the second pressure reduction valve 214. The linear solenoid valve SLS regulates the modulator pressure $P_M$ as an original pressure, to a signal pressure $P_{SLS}$, and delivers the signal pressure $P_{SLS}$ to the third pressure reduction valve 215.

The primary hydraulic cylinder 51c is connected to the second pressure reduction valve 214, via a fourth oil passage 204. The second pressure reduction valve 214 and the fourth oil passage 204 form a speed ratio control circuit of the CVT 5. The second pressure reduction valve 214 is a valve for controlling the speed ratio γ of the CVT 5. The second pressure reduction valve 214 controls the amount (pressure) of oil supplied to the primary hydraulic cylinder 51c. The second pressure reduction valve 214 regulates the first line pressure $P_{L1}$ as an original pressure to the primary pressure $P_{in}$, and supplies the pressure $P_{in}$ to the primary hydraulic cylinder 51c. The second pressure reduction valve 214 controls the primary pressure $P_{in}$, based on the signal pressure $P_{SLP}$ received from the linear solenoid valve SLP. The ECU 100 controls a hydraulic command signal generated to the linear solenoid valve SLP, so as to adjust the primary pressure P. With the primary pressure $P_{in}$ thus changed, the V-groove width of the primary pulley 51 changes. The ECU 100 controls the speed ratio γ of the CVT 5, by controlling the primary pressure $P_{in}$.

Under upshift control, for example, the primary pressure $P_{in}$ is increased, so that the V-groove width of the primary pulley 51 is continuously reduced. During upshift, the speed ratio γ of the CVT 5 is continuously reduced. Under downshift control, the primary pressure $P_{in}$ is reduced, so that the V-groove width of the primary pulley 51 is continuously increased. During downshift, the speed ratio γ of the CVT 5 is continuously increased. During downshift, the oil in the primary hydraulic cylinder 51c is discharged from a drain port of the second pressure reduction valve 214, so that the primary pressure $P_{in}$ is reduced. Also, under speed ratio maintenance control executed during free running, the speed ratio γ of the CVT 5 is kept substantially constant. For example, the fourth oil passage 204 is closed by the second pressure reduction valve 214, so that the primary pressure $P_{in}$ is kept at a given value. Even in the case where the speed ratio γ is to be kept constant, the primary pressure $P_{in}$ may be reduced unintendedly, due to oil leakage. Therefore, during the speed ratio maintenance control, the second pressure reduction valve 214 may be opened only by a given channel cross-sectional area, such that the first oil passage 201 and the fourth oil passage 204 communicate with each other. In this manner, a part of the first line pressure $P_{L1}$ can be supplied to the primary hydraulic cylinder 51c.

The secondary hydraulic cylinder 52c is connected to the third pressure reduction valve 215, via a fifth oil passage 205. The third pressure reduction valve 215 and the fifth oil passage 205 form a clamping force control circuit of the CVT 5. The third pressure reduction valve 215 is a valve for controlling the belt clamping force. The third pressure reduction valve 215 controls the amount (pressure) of oil supplied to the secondary hydraulic cylinder 52c. The third pressure reduction valve 215 regulates the first line pressure $P_{L1}$ as an original pressure to the secondary pressure $P_{out}$, and supplies the pressure $P_{out}$ to the secondary hydraulic cylinder 52c. The third pressure reduction valve 215 controls the secondary pressure $P_{out}$, based on the signal pressure $P_{SLS}$ received from the linear solenoid valve SLS. The ECU 100 controls a hydraulic command signal generated to the linear solenoid valve SLS, so as to adjust the secondary pressure $P_{out}$. With the second pressure $P_{out}$ thus changed, the belt clamping force of the CVT 5 changes. The ECU 100 controls the clamping force of the CVT 5, by controlling the secondary pressure $P_{out}$.

For example, the third pressure reduction valve 215 operates to increase the secondary pressure $P_{out}$ of the secondary hydraulic cylinder 52c as the signal pressure $P_{SLS}$ increases. Namely, the ECU 100 increases a hydraulic command value to the linear solenoid valve SLS, so as to increase the belt clamping force. The belt clamping force is force with which the belt 53 is clamped by the V groove of each pulley 51, 52. With the belt clamping force thus applied, frictional force is produced between both of the pulleys 51, 52 and the belt 53 in the rotating CVT 5. Namely, owing to the belt clamping force, tension arises in the belt 53 that is wrapped around the V grooves of the respective pulleys 51, 52. Accordingly, the secondary hydraulic cylinder 52c needs to produce belt clamping force that prevents the belt 53 from slipping in both of the pulleys 51, 52. Thus, the secondary pressure $P_{out}$ is regulated and controlled by the third pressure reduction valve 215, so that the required belt clamping force is generated. When no belt slipping occurs, such as when rotation of the CVT 5 is stopped, the required belt clamping force is reduced. In this case, the oil in the secondary hydraulic cylinder 52c is discharged from a drain port of the third pressure reduction valve 215, so that the secondary pressure $P_{out}$ is reduced.

Figure 5A:
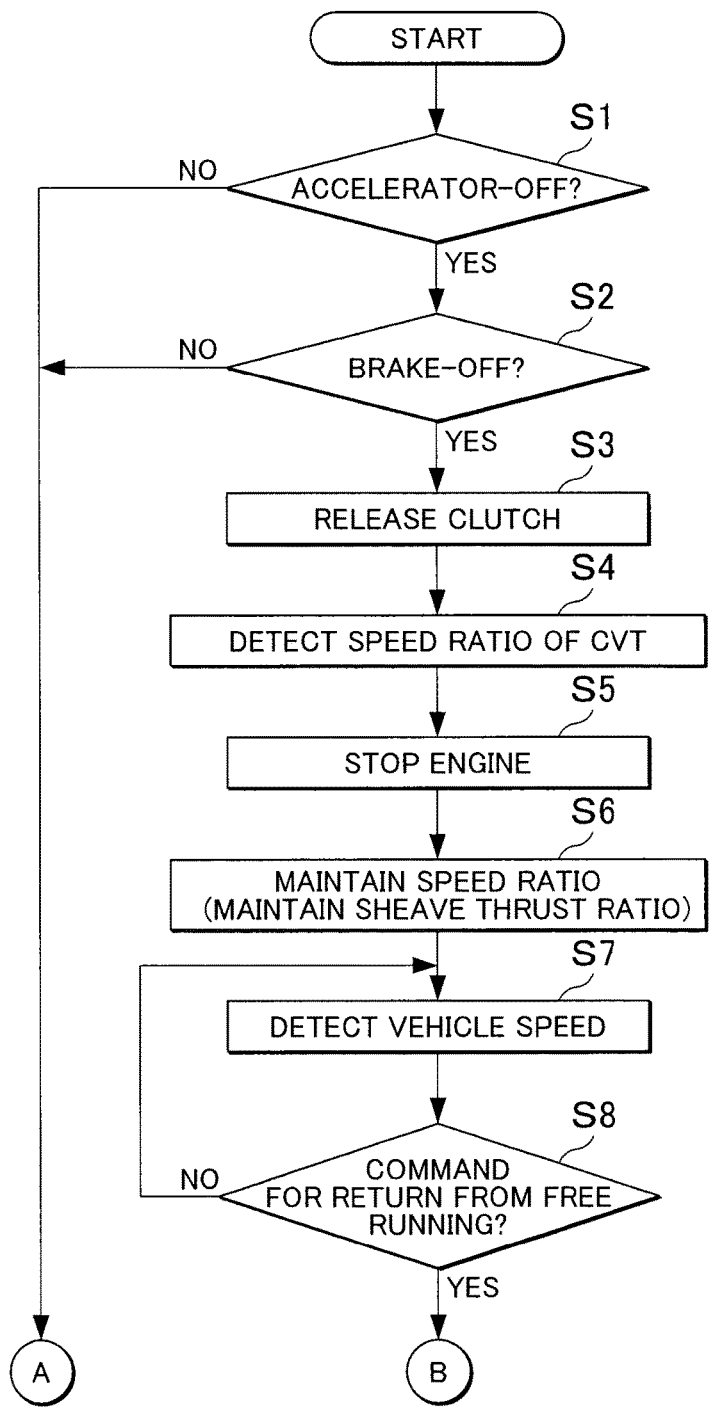
FIG. 5A and FIG. 5B are flowcharts illustrating one example of free-running control.
Figure 5B:
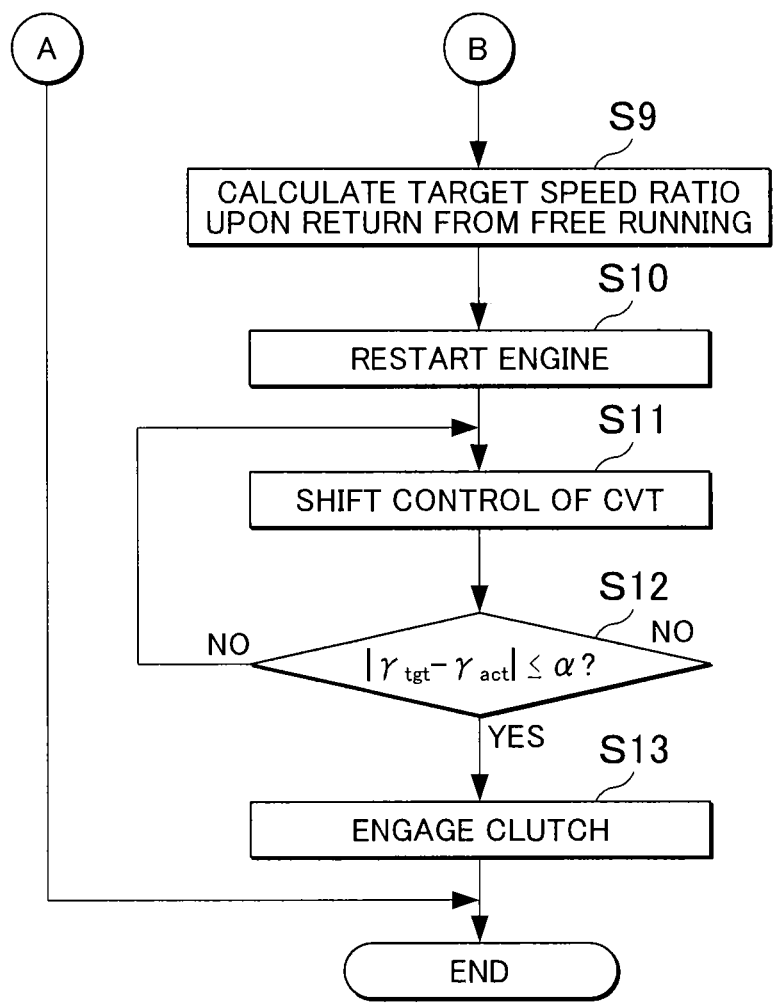

FIG. 5A and FIG. 5B are flowcharts illustrating one example of free-running control. The ECU 100 executes control flow illustrated in FIG. 5A and FIG. 5B, from a condition where the vehicle Ve is controlled in a normal traveling state. In the normal traveling state, the second clutch C2 is engaged, and the vehicle Ve travels forward with power of the engine 1.

The determining unit 104 determines whether the accelerator pedal is in the OFF state (accelerator-OFF), based on a signal from the accelerator pedal position sensor 36, during normal traveling of the vehicle Ve (step S1). If the accelerator pedal is in the OFF state, and an affirmative decision (YES) is obtained in step S1, the determining unit 104 determines whether the brake pedal is in the OFF state (brake-OFF), based on a signal from the brake stroke sensor 37 (step S2). In steps S1, S2, the determining unit 104 determines whether a condition (free-running execution condition) under which free running is started is satisfied. The free-running execution condition is that the accelerator pedal is in the OFF state and the brake pedal is in the OFF state, during normal traveling of the vehicle Ve. Therefore, when the accelerator pedal is not in the OFF state, and a negative decision (NO) is obtained in step S1, or when the brake pedal is not in the OFF state, and a negative decision (NO) is obtained in step S2, the free-running execution condition is not satisfied. The ECU 100 finishes this control routine, when a negative decision (NO) is obtained in step S1 or when a negative decision (NO) is obtained in step S2. Namely, the vehicle Ve is kept in the normal traveling state, without being brought into a free-running state. The statement that the accelerator pedal is in the OFF state means that the accelerator pedal is returned to the original position, such as when the driver releases the accelerator pedal. The accelerator pedal is in the OFF state when the operation amount of the accelerator pedal (or the accelerator pedal stroke) is equal to zero. The statement that the brake pedal is in the OFF state means that the brake pedal is returned to the original position, such as when the driver releases the brake pedal. The brake pedal is in the OFF state when the brake pedal force or brake stroke amount is equal to zero.

When the brake pedal is in the OFF state, and an affirmative decision (YES) is obtained in step S2 (the free-running execution condition: satisfied), the traveling controller 101 releases the second clutch C2 (step S3), and detects the speed ratio γ of the CVT 5 (step S4). The order of execution of step S3 and step S4 is not limited to that of FIG. 5A. For example, step S3 and step S4 may be executed at substantially the same time, or step S4 may be executed, and step S3 may be then executed. After detecting the speed ratio γ of the CVT 5, the traveling controller 101 automatically stops the engine 1 (step S5). Control of steps S3-S5 is free-running start control.

In the free-running start control, the traveling controller 101 detects the speed ratio γ of the CVT 5, before stopping the engine 1. This is because, after the second clutch C2 is released and the engine 1 is stopped, rotation of the CVT 5 is stopped, and the speed ratio of the CVT 5 cannot be detected. In sum, the traveling controller 101 is only required to be configured to detect the speed ratio γ of the CVT 5 at the start of free running.

The traveling controller 101 keeps the speed ratio γ of the CVT 5 at the speed ratio detected at the start of free running (step S6). For example, when step S5 and step S6 are executed at the same time, the speed ratio γ of the CVT 5 is fixed at the start of free running. Then, during free running of the vehicle Ve, the traveling controller 101 keeps the V-groove widths of the respective pulleys 51, 52 at the V-groove widths at the start of free running. In this case, the ratio (thrust ratio) between the thrust of the primary pulley 51 and the trust of the secondary pulley 52 is maintained. Namely, the traveling controller 101 controls the hydraulic pressure ratio (hydraulic pressure balance) between the primary pressure $P_{in}$ and the secondary pressure $P_{out}$, so that the V-groove widths of the respective pulleys 51, 52 do not change. Accordingly, the traveling controller 101 performs control (speed ratio maintenance control) for keeping the hydraulic pressure ratio or balance in a condition at the start of free running. In this manner, the speed ratio γ of the CVT 5 is kept at a value at the start of free running. During free running of the vehicle Ve, the traveling controller 101 can reduce the primary pressure $P_{in}$ and the secondary pressure $P_{out}$, provided that the hydraulic pressure ratio or balance can be kept in the condition at the start of free running. Since rotation of the CVT 5 is stopped during free running of the vehicle Ve, the V-groove widths of the respective pulleys 51, 52 can be kept in a condition at the start of free running, even if the hydraulic pressures applied to these pulleys are lower than those before start of free running. Further, the traveling controller 101 detects the vehicle speed V, during free running of the vehicle Ve (step S7).

The determining unit 104 determines whether a condition (free-running return condition) under which the vehicle Ve returns from free running to normal traveling is satisfied (step S8). The free-running return condition includes the case where the accelerator pedal is in the ON state (accelerator-ON), or the case where the brake pedal is in the ON state (brake-ON). When a free-running return command is generated in response to a driver's request in the form of "accelerator-ON" or "brake-ON", the free-running return condition is satisfied, and an affirmative decision (YES) is obtained in step S8. Also, the free-running return condition may include electric power consumption, the state of charge (SOC) of the battery, the oil temperature of the transmission, etc. On the basis of these parameters, a free-running return command requested by the system is generated. If the free-running return condition is not satisfied, and a negative decision (NO) is obtained in step S8, the ECU 100 returns to step S7, detects the current vehicle speed V, and repeats the determining operation of step S8. The accelerator pedal is in the ON state (accelerator-ON) when the accelerator pedal is depressed by the driver, namely, when the operation amount of the accelerator pedal (or the accelerator pedal stroke) is larger than zero. The brake pedal is in the ON state (brake-ON) when the brake pedal is depressed by the driver, namely, when the brake pedal force or the brake stroke amount is larger than zero.

If the free-running return condition is satisfied, and an affirmative decision (YES) is obtained in step S8, the return controller 102 calculates a target speed ratio $\gamma_{tgt}$ at the time of return from free running (step S9). Also, the return controller 102 restarts the engine 1 (step S10), and performs shift control on the stepless speed change part (CVT 5) (step S11). In step S11, downshift control for increasing the speed ratio $\gamma$ of the CVT 5 toward the target speed ratio $\gamma_{tgt}$ is performed. More specifically, the return controller 102 calculates the target speed ratio $\gamma_{tgt}$ at the time of return from free running, based on a shift map representing the relationship between the vehicle speed V and the input shaft speed $N_{in}$. One example of the shift map is shown in FIG. 6.

Figure 6:
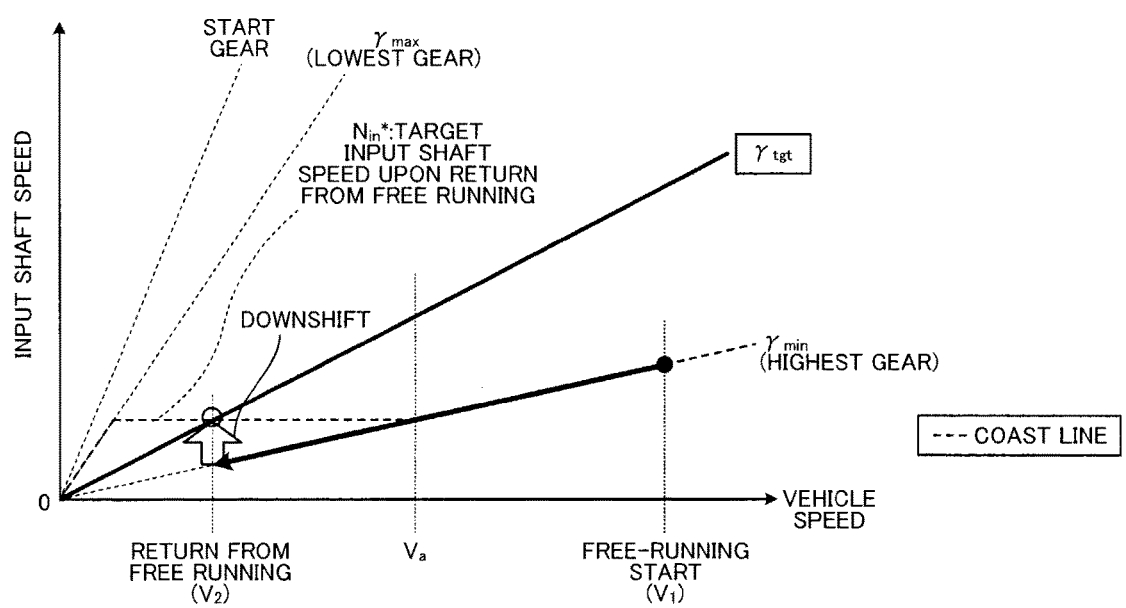
FIG. 6 is a view showing one example of a shift map.

As shown in FIG. 6, the speed ratio $\gamma$ of the CVT 5 is determined, based on the vehicle speed V and the input shaft speed $N_{in}$ as parameters. The speed ratio of the CVT 5 is changed based on the shift map. Here, the case where the speed ratio $\gamma$ of the CVT 5 at the start of free running is equal to the minimum speed ratio $\gamma_{min}$ will be described. During free running of the vehicle Ve, the speed ratio $\gamma$ of the CVT 5 is kept at the minimum speed ratio $\gamma_{min}$. The vehicle speed $V_2$ at the time of return from free running is lower than the vehicle speed $V_1$ at the start of free running. Therefore, the CVT 5 is shifted down, as shift control of the stepless speed change part at the time of return from free running. With the downshift control thus performed, the speed ratio $\gamma$ of the CVT 5 is changed from the minimum speed ratio $\gamma_{min}$ at the start of free running, to the target speed ratio $\gamma_{tgt}$. As a method of determining the target speed ratio $\gamma_{tgt}$, the speed ratio setting unit 103 determines a target input shaft speed $N_{in}^*$, and determines the speed ratio based on the target input shaft speed $N_{in}^*$ and the vehicle speed $V_2$ at the time when the return condition is satisfied, as the target speed ratio $\gamma_{tgt}$. The target input shaft speed $N_{in}^*$ is set to a value larger than a given rotational speed at which engine stall occurs, or the NV performance deteriorates. For example, the target input shaft speed $N_{in}^*$ is set to an input shaft speed on a coast line. The coast line is a shift line for the case where the operation amount of the accelerator pedal is equal to zero (Acc=0%) during normal traveling. At the vehicle speed $V_2$ at the time of return from free running, the input shaft speed corresponding to the minimum speed ratio $\gamma_{min}$ is lower than the target input shaft speed $N_{in}^*$ on the coast line. This is because the vehicle speed $V_2$ at the time of return from free running is lower than the lower-limit vehicle speed $V_a$ in the case where the vehicle coasts at the minimum speed ratio $\gamma_{min}$. Thus, with the downshift control thus performed at the time of return from free running, the input shaft speed $N_{in}$ is increased to the target input shaft speed $N_{in}^*$ on the coast line. The return controller 102 reduces the primary pressure $P_{in}$ by discharging the oil in the primary hydraulic cylinder 51c, so as to increase the V-groove width of the primary pulley 51. As a result, the speed ratio $\gamma$ of the CVT 5 is increased toward the target speed ratio $\gamma_{tgt}$.

After the shift control of step S11 is started, the determining unit 104 determines whether a difference ($=|\gamma_{tgt}-\gamma_{act}|$) between the target speed ratio $\gamma_{tgt}$ and the actual speed ratio $\gamma_{act}$ of the CVT 5 is equal to or smaller than a predetermined threshold value $\alpha$ (step S12). Since the CVT 5 is rotating at this time, the actual speed ratio $\gamma_{act}$ can be detected (calculated) based on detection values of the input shaft speed $N_{in}$ and the first output shaft speed $N_{out1}$. If the difference between the speed ratios is larger than the threshold value $\alpha$, and a negative decision (NO) is obtained in step S12, the ECU 100 returns to step S11, and continues shift control of the stepless speed change part.

If the difference between the target speed ratio $\gamma_{tgt}$ and the actual speed ratio $\gamma_{act}$ of the CVT 5 is equal to or smaller than the threshold value $\alpha$, and an affirmative decision (YES) is obtained in step S12, the return controller 102 engages the second clutch C2 (step S13). When the difference between the speed ratios is equal to or smaller than the threshold value $\alpha$ as described above, a difference between the first output shaft speed $N_{out1}$ and the second output shaft speed $N_{out2}$ is reduced. Therefore, the rotational speeds of the engaging elements of the second clutch C2 become close to the synchronous rotational speed. Accordingly, shock can be reduced when the second clutch C2 is engaged. With step S13 thus executed, the second clutch C2 is engaged, and the engine 1 is driven; therefore, the free-running state ends. Namely, if step S13 is executed, the return control is completed. In sum, the vehicle returns from free running, when the ECU 100 restarts the engine 1, and engages the second clutch C2, during free running of the vehicle Ve. When the vehicle returns from free running to normal traveling, this control routine ends.

The control of steps S8-S13 is control (return control) for returning the vehicle from free running to normal traveling. The return controller 102 is configured to restart the engine 1, resume rotation of the CVT 5, and perform shift control (downshift) of the CVT 5, before engaging the second clutch C. In sum, the time at which the engine 1 is restarted is different from the time at which the second clutch C2 is engaged. After the engine 1 is restarted, and the downshift control of the CVT 5 is started, the second clutch C2 is engaged.

Figure 7:
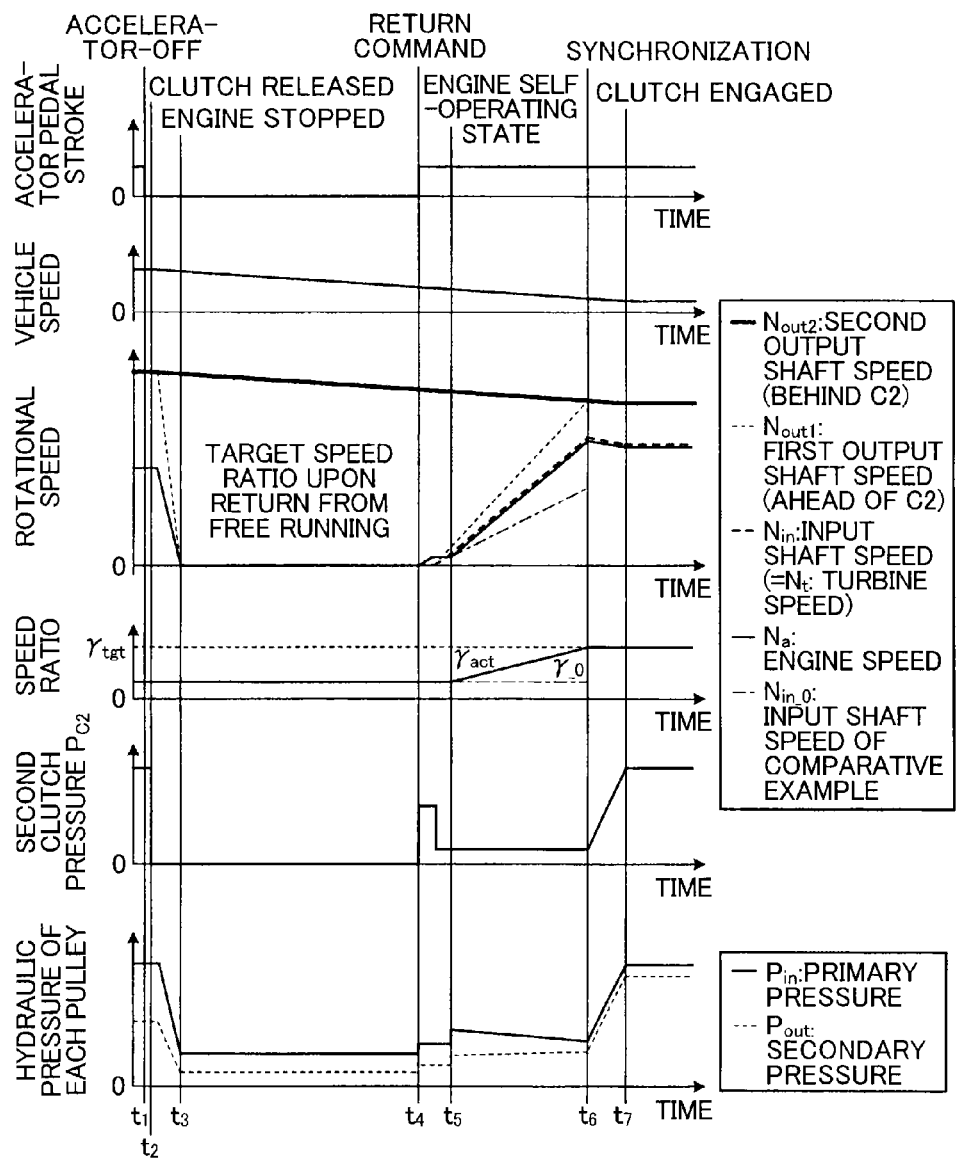
FIG. 7 is a time chart showing changes in vehicle conditions when the vehicle returns from free running.

FIG. 7 is a time chart of the case where free-running control is performed. During normal traveling of the vehicle Ve at a given vehicle speed V, the "acceleration-OFF" state is detected, and the free-running control is started (time $t_1$). At time $t_1$, the brake pedal is in the OFF state. Once the free-running control is started, clutch release control for reducing the second clutch pressure $P_{C2}$ of the second clutch C2 down to zero is started. When the second clutch pressure $P_{C2}$ becomes equal to zero, the second clutch C2 is completely released (time $t_2$). Also, supply of fuel to the engine 1 and ignition are stopped, so that the engine speed $N_e$ and the input shaft speed $N_{in}$ are reduced. Since the second clutch C2 is released, the first output shaft speed $N_{out1}$ is reduced to be lower than the second output shaft speed $N_{out2}$. Then, rotation of the engine 1 is stopped (time $t_3$). At time $t_3$, rotation of the CVT 5 is also stopped, so that all of the engine speed $N_e$, the input shaft speed $N_{in}$, and the first output shaft speed $N_{out1}$ become equal to zero. During a period between time $t_2$ and time $t_3$, the hydraulic pressures (primary pressure $P_{in}$, secondary pressure $P_{out}$) in the respective hydraulic cylinders 51c, 52c are reduced to given hydraulic pressures, such that the thrust ratio (hydraulic pressure ratio) between the pulleys 51, 52 is maintained. The given hydraulic pressures are set to larger values than zero. During free-running control, the hydraulic pressure ratio between the primary pressure $P_{in}$ and the secondary pressure $P_{out}$ is kept at the ratio at the start of free-running. Also, the vehicle speed V is reduced during free running in the example shown in FIG. 7.

Then, a command for return from free running is detected (time $t_4$). At time $t_4$, the "accelerator-ON" state is detected, so that the free-running return condition is satisfied, and the free-running return control is started. A hydraulic pressure is supplied to the hydraulic actuator of the second clutch C2 that has been completely released, and the second clutch pressure $P_{C2}$ is increased to such a level that reduces a gap between the engaging elements of the clutch C2. For example, as a preparation stage before engagement of the second clutch C2, the second clutch pressure $P_{C2}$ is controlled to a level at which the transmission torque capacity of the second clutch C2 is equal to zero, and the gap between the engaging elements is eliminated. Also, the hydraulic pressures (primary pressure $P_{in}$, secondary pressure $P_{out}$) are supplied to the respective hydraulic cylinders 51c, 52c of the CVT 5. In this case, the primary pressure and the secondary pressure $P_{out}$ are increased, in a condition where the hydraulic pressure ratio is maintained or kept constant.

Further, the return controller 102 executes engine start control, and restarts the engine 1. In the engine start control, the engine 1 is started by cranking, by means of a starter, for example. Then, the engine 1 is brought into a self-operating state (time $t_5$). The self-operating state is a state in which combustion takes place in each cylinder of the engine 1, and the engine 1 rotates by itself. The engine 1 shifts from a state in which it is rotated by a starter, or the like, to the state in which it can rotate by itself. The engine speed $N_e$ at this time is a self-rotational speed. Once the engine 1 is placed in the self-operating state, it starts generating engine torque, through fuel supply and ignition, and the engine speed $N_e$ starts increasing. Namely, the CVT 5 starts rotating, and the input shaft speed $N_{in}$ and the first output shaft speed $N_{out1}$ start increasing from zero. Therefore, at time $t_5$, the primary pressure $P_{in}$ and the secondary pressure $P_{out}$ of the respective pulleys 51, 52 are increased so as to prevent the belt 53 of the CVT 5 from slipping. In this connection, when the engine start control is executed after time t4, and the CVT 5 starts rotating, the primary pulley 51 and the secondary pulley 52 start rotating at the same time, so that the input shaft speed $N_{in}$ (=turbine speed $N_t$) and the first output shaft speed $N_{out1}$ start increasing from zero at the same time.

From time $t_5$, the return controller 102 starts downshift control of the CVT 5. In the downshift control, the primary pressure $P_{in}$ is reduced, and the secondary pressure $P_{out}$ is increased. As a result, the V-groove width of the primary pulley 51 is increased, and the V-groove width of the secondary pulley 52 is reduced. With the downshift control thus started, the speed ratio γ (the actual speed ratio $γ_{act}$) of the CVT 5 starts increasing toward the target speed ratio $γ_{tgt}$. Namely, the input shaft speed starts increasing toward the target input shaft speed $N_{in}$*. Further, during execution of the downshift control (while the CVT 5 is being shifted down), the return controller 102 controls the second clutch pressure $P_{C2}$ within a range in which the second clutch C2 does not produce the transmission torque capacity. In this case, the second clutch pressure $P_{C2}$ is kept at a given hydraulic pressure that is larger than zero. Then, when the speed ratio γ of the CVT 5 reaches the target speed ratio $γ_{tgt}$, the downshift control is completed (time $t_6$). When the speed ratio γ of the CVT 5 becomes equal to the target speed ratio $γ_{tgt}$ at time $t_6$, the first output shaft speed $N_{out1}$ becomes equal to the second output shaft $N_{out2}$. Therefore, the ECU 100 starts engagement control of the second clutch C2 from time $t_6$. Through the engagement control, the second clutch pressure $P_{C2}$ that has been kept at the given hydraulic pressure is increased, so that the second clutch C2 is completely engaged (time $t_7$). At time $t_7$, the free-running return control is completed. In this manner, return from free running to normal traveling is completed. During a period between time $t_5$ and time $t_6$, the CVT 5 is in the middle of downshifting, and the actual speed ratio $γ_{act}$ of the CVT 5 is continuously increased.

Here, it is to be noted that time $t_6$ is the time at which the second clutch C2 is engaged. How the input shaft speed $N_{in}$ (=engine speed $N_e$) detected at this time $t_6$ differs depending on whether or not downshift was performed will be studied. For the sake of comparative explanation, it is assumed the first output shaft speed $N_{out1}$ in the case where downshift was performed, and the first output shaft speed $N_{out1}$ in the case where no downshift was performed are equal to each other at time $t_6$. In this connection, time $t_6$ is the time at which, in the second clutch C2, the rotational speed (=first output shaft speed $N_{out1}$) of the input-side engaging element, and the rotational speed (=second output shaft speed $N_{out2}$) of the output-side engaging element become equal to each other.

During the period between time $t_5$ and time $t_6$ of FIG. 7, as a comparative example of the case where downshift control was not performed, the input shaft speed (which will be called "comparative speed") $N_{in\_0}$ of the comparative example, and the speed ratio (which will be called "comparative speed ratio") $γ_{\_0}$ of the comparative example are indicated by respective one-dot chain lines. The comparative speed ratio $γ_{\_0}$, which is equal to the speed ratio γ of the CVT 5 at the start of free running, is smaller than the target speed ratio $γ_{tgt}$. Accordingly, at time $t_6$, the input shaft speed $N_{in}$ (=$γ_{tgt}$×$N_{out1}$) in the case where the downshift control was performed is higher than the comparative rotational speed $N_{in\_0}$ (=$γ_{\_0}$×$N_{out1}$) in the case where the downshift control was not performed. Further, in the period between time $t_5$ and time $t_6$, the amount of increase (rate of increase) of the input shaft speed $N_{in}$ is larger than the amount of increase (rate of increase) of the comparative rotational speed $N_{in\_0}$. Namely, the return controller 102 executes downshift control, so that the input shaft speed $N_{in}$ (engine speed $N_e$) at the time when the second clutch C2 is engaged can be made higher than that in the case where the downshift control was not performed. Thus, the input shaft speed $N_{in}$ (engine speed $N_e$) at the time of return from free running can be made higher than a low-rotational-speed range (that is lower than a possible rotational speed range during normal traveling) in which the NV performance deteriorates, or a low-rotational-speed range in which engine stall occurs.

As explained above, according to the vehicle control system of this embodiment, when the vehicle returns from free running to normal traveling, the continuously variable transmission is shifted down before the clutch is engaged, so that the input shaft speed is less likely or unlikely to be reduced due to engagement of the clutch. Thus, since reduction of the engine speed at the time of return from free running can be curbed, the driver is less likely or unlikely to feel strange or uncomfortable. Furthermore, free-running control can be continued until the vehicle speed becomes lower than that permitted in the known system.

The above-described target input shaft speed $N_{in}*$ is not limited to the rotational speed on the coast line. In sum, when the vehicle returns from free running, it is only required to prevent the engine speed $N_e$ from being included in a low rotational speed range in which engine stall or deterioration of noise and vibration (NV) causes a problem, due to engagement of the second clutch C2. To this end, the target input shaft speed $N_{in}*$ is only required to be included in a rotational speed range that is higher than the above-described low-rotational-speed range; thus, the target input shaft speed $N_{in}*$ may be higher than the input shaft speed on the coast line, or may be lower than the input shaft speed on the coast line.

Next, a modified example of the ECU 100 as described above will be described. In this modified example, a plurality of conditions, i.e., a first return condition, a second return condition, and a third return condition, are set as free-running return conditions. The ECU 100 of this modified example is configured to set a selected one of target speed ratios of different values to the target speed ratio at the time of return from free running, according to the condition that is satisfied, as one of the plurality of return conditions. Namely, the target input shaft speed in the downshift control at the time of return from free running can be varied, according to the satisfied return condition. In the following description of the modified example, the same or similar configuration as that of the above-described embodiment will not be described.

Figure 8A:
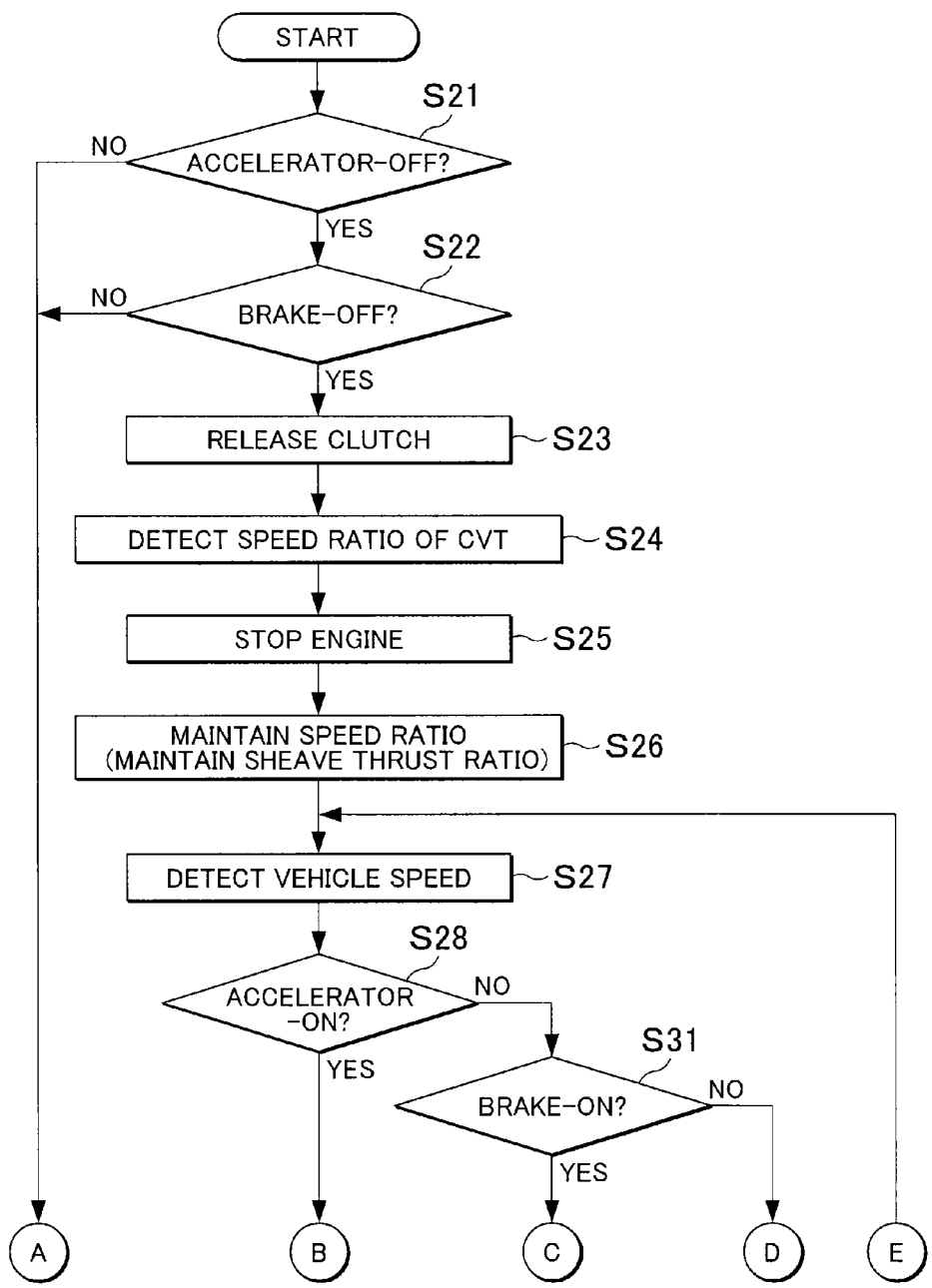
FIG. 8A and FIG. 8B are flowcharts illustrating another example of free-running control.
Figure 8B:
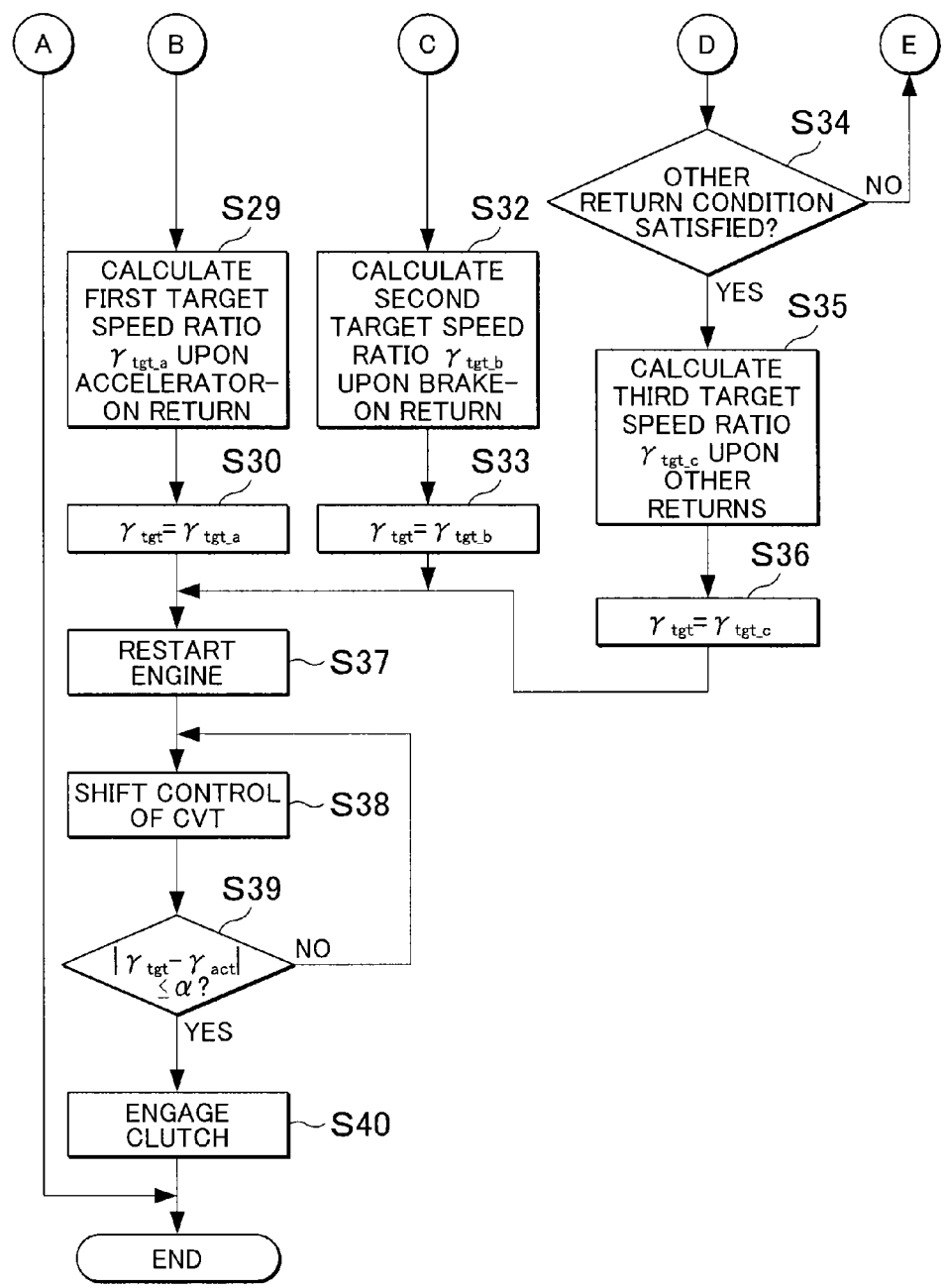

FIG. 8A and FIG. 8B are flowcharts illustrating free-running control executed by the ECU 100 of the modified example. Steps S21-S27, S37-S40 of FIG. 8A and FIG. 8B are substantially identical with steps S1-S7, S10-S13 of FIG. 5A and FIG. 5B. Here, steps S28-S36 of FIG. 8 will be described.

The determining unit 104 determines whether the accelerator pedal is in the ON state (accelerator-ON), during free running of the vehicle Ve (step S28). In step S28, it is determined whether a first return condition, as one of the free-running return conditions, is satisfied. The first return condition is that the accelerator pedal is in the ON state (accelerator-ON). If the accelerator pedal is in the ON state, and an affirmative decision (YES) is obtained in step S28 (first return condition: satisfied), the speed ratio setting unit 103 calculates a first target speed ratio $\gamma_{tgt\_a}$ at the time of return from free running caused by "accelerator-ON" (step S29). The speed ratio setting unit 103 determines a first target input shaft speed $N_{in\_a}*$ at the time of "accelerator-ON" return, based on a shift map shown in FIG. 9 which will be described later. Then, the speed ratio setting unit 103 determines the first target speed ratio $\gamma_{tgt\_a}$, using the first target input shaft speed $N_{in\_a}*$, and the vehicle speed V detected in step S27. Also, the speed ratio setting unit 103 sets the first target speed ratio $\gamma_{tgt\_a}$ calculated in step S29, as the target speed ratio $\gamma_{tgt}$ at the time of return from free running (step S30). If the first return condition is satisfied, and the target speed ratio $\gamma_{tgt}$ is set to the first target speed ratio $\gamma_{tgt\_a}$, the ECU 100 proceeds to step S37.

If the accelerator pedal is not in the ON state, and a negative decision (NO) is obtained in step S28, the determining unit 104 determines whether the brake pedal is in the ON state, during free running of the vehicle Ve (step S31). In step S31, it is determined whether a second return condition, as one of the free-running return conditions, is satisfied. The second return condition is that the brake pedal is in the ON state (brake-ON). If the brake pedal is in the ON state, and an affirmative decision (YES) is obtained in step S31 (second return condition: satisfied), the speed ratio setting unit 103 calculates a second target speed ratio $\gamma_{tbt\_b}$ at the time of return from free running caused by "brake-ON" (step S32). The speed ratio setting unit 103 determines a second target input shaft speed $N_{in\_b}*$ at the time of "brake-ON" return, based on the shift map shown in FIG. 9 which will be described later. Then, the speed ratio setting unit 103 determines the second target speed ratio $\gamma_{tgt\_b}$, using the second target input shaft speed $N_{in\_b}*$, and the vehicle speed V detected in step S27. Also, the speed ratio setting unit 103 sets the second target speed ratio $\gamma_{tgt\_b}$ calculated in step S32, as the target speed ratio $\gamma_{tgt}$ at the time of return from free running (step S33). If the second return condition is satisfied, and the target speed ratio $\gamma_{tgt}$ is set to the second target speed ratio $\gamma_{tgt\_b}$, the ECU 100 proceeds to step S37.

If the brake pedal is not in the ON state, and a negative decision (NO) is obtained in step S31, the determining unit 104 determines whether another return condition is satisfied, during free running of the vehicle Ve (step S34). In step S34, it is determined whether a third return condition, as one of the free-running return conditions, is satisfied. The other return condition (third return condition) is a return condition other than "accelerator-ON" and "brake-ON". For example, the third return condition may be selected from the case where the actual vehicle speed V reaches the upper or lower limit of a vehicle speed range in which free running is feasible, the state of charge (SOC) of the battery, the oil temperature (T/M oil temperature) of the transmission, and so forth. For example, the third return condition is satisfied, when the vehicle speed V is reduced during free running, and reaches the lower-limit vehicle speed in the range in which free running is feasible. Also, the third return condition is satisfied, when the power of the battery is consumed during free running, and the SOC is reduced to a predetermined threshold value. In another example, the third return condition is satisfied, when the T/M oil temperature is reduced during free running, and reaches a predetermined temperature. If the T/M oil temperature is reduced, the viscosity of the oil increases, and the viscosity resistance increases. As the viscosity resistance increases, a loss increases when rotating members, such as gears, rotate, and the traveling distance is shortened. Namely, in step S34, it is determined whether a free-running return command requested by the system is generated. If the third return condition is not satisfied, and a negative decision (NO) is obtained in step S34, the ECU 100 returns to step S27.

If the third return condition is satisfied, and an affirmative decision (YES) is obtained in step S34, the speed ratio setting unit 103 calculates a third target speed ratio $\gamma_{tgt\_c}$ at the time of return from free running caused by satisfaction of the other return condition (step S35). The speed ratio setting unit 103 determines a third target input shaft speed $N_{in\_c}*$ at the time of other returns, based on the shift map shown in FIG. 9 which will be described later. Then, the speed ratio setting unit 103 determines the third target speed ratio $\gamma_{tgt\_c}$, using the third target input shaft speed $N_{in\_c}^*$, and the vehicle speed V detected in step S27. Also, the speed ratio setting unit 103 sets the third target speed ratio $\gamma_{tgt\_c}$ calculated in step S35, as the target speed ratio $\gamma_{tgt}$ at the time of return from free running (step S36). If the third return condition is satisfied, and the target speed ratio $\gamma_{tgt}$ is set to the third target speed ratio $\gamma_{tgt\_c}$, the ECU 100 proceeds to step S37.

Figure 9:
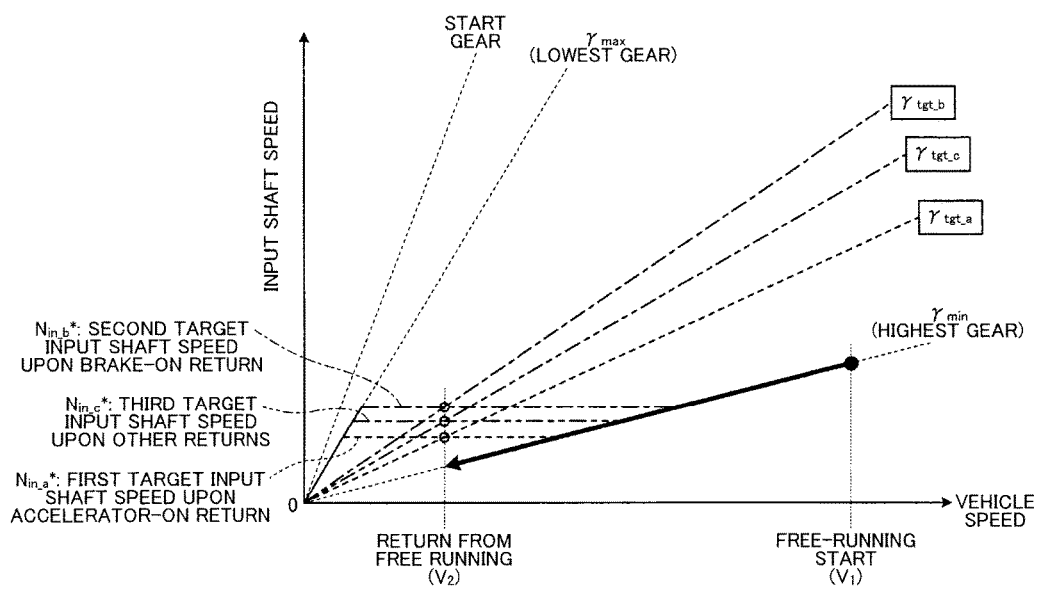
FIG. 9 is a view showing another example of a shift map.

FIG. 9 is an explanatory view showing the shift map of this modified example. In FIG. 9, a broken line indicates the first target input shaft speed $N_{in\_a}^*$ at the time of "accelerator-ON" return, a one-dot chain line indicates the second target input shaft speed $N_{in\_b}^*$ at the time of "brake-ON" return, while a two-dot chain line indicates the third target input shaft speed $N_{in\_c}^*$ at the time of other returns. Like FIG. 6, FIG. 9 shows the case where the vehicle Ve returns from free running at a vehicle speed $V_2$, after it starts free-running from an operating state of a vehicle speed $V_1$ at the minimum speed ratio $\gamma_{min}$. The vehicle speed $V_2$ at the time when a return condition is satisfied is lower than the vehicle speed $V_1$ at the start of free-running, and is also lower than the lower-limit vehicle speed $V_a$ when the vehicle Ve coasts at the minimum speed ratio $\gamma_{min}$. In the example shown in FIG. 9, too, the input shaft speed at the time of vehicle speed $V_2$ on a straight line corresponding to the minimum speed ratio $\gamma_{min}$ is lower than the input shaft speed on the above-described coast line.

The speed ratio setting unit 103 determines the target input shaft speed $N_{in}^*$, and sets the target speed ratio $\gamma_{tgt}$ based on the target input shaft speed $N_{in}^*$ and the vehicle speed $V_2$ at the time when the return condition is satisfied. The target input shaft speed $N_{in}^*$ of this modified example is selected from the first target input shaft speed $N_{in\_a}^*$, the second target input shaft speed $N_{in\_b}^*$, and the third target input shaft speed $N_{in\_c}^*$. Each of the target input shaft speeds $N_{in\_a}^*$, $N_{in\_c}^*$ is set to a value included in a rotational speed range (that is equal to or higher than the input shaft speed on the coast line at vehicle speed $V_2$, for example) in which no problem arises from occurrence of engine stall and deterioration of vibration and noise (NV).

Since an acceleration request is made when the accelerator pedal is in the ON state (the first return condition: satisfied) at the time of return from free running, the engine torque needs to be transmitted to the drive wheels. On the other hand, since a braking request is made when the brake pedal is in the ON state (the second return condition: satisfied) at the time of return from free running, it is not necessary to transmit engine torque to the drive wheels 11, but is only required to reduce the rotational speed of the drive wheels 11. Namely, if completion of engagement of the second clutch C2 is delayed, and generation of drive torque at the drive wheels 11 is delayed, when the first return condition is satisfied, the driver who is making a request for acceleration may feel strange or uncomfortable.

Thus, in this modified example, the first target input shaft speed $N_{in\_a}^*$ at the time of "accelerator-ON" return is set to a rotational speed that is lower than the second target input shaft speed $N_{in\_b}^*$ at the time of "brake-ON" return, and the third target input shaft speed $N_{in\_c}^*$ at the time of other returns. In the downshift operation at the time of return from free running, the amount of rise (the amount of change of the rotational speed during downshift) of the input shaft speed $N_{in}$ (=engine speed $N_e$) in the case where it is set to the first target input shaft speed $N_{in\_a}^*$ is reduced to be smaller than that in the case where it is set to the second target input shaft speed $N_{in\_b}^*$ or the case where it is set to the third target input shaft speed $N_{in\_c}^*$. As a result, the length of time it takes for the input shaft speed $N_{in}$ (engine speed $N_e$) to be raised to the first target input shaft speed $N_{in\_a}^*$ at the time of "accelerator-ON" return can be reduced, and the length of time it takes to complete engagement of the second clutch C2 can be reduced.

Also, the second target input shaft speed $N_{in\_b}^*$ at the time of "brake-ON" return is set to a rotational speed that is higher than the third target input shaft speed $N_{in\_c}^*$ at the time of other returns. The above-indicated target input shaft speeds have a relationship that "first target input shaft speed $N_{in\_a}^*$<third target input shaft speed $N_{in\_c}^*$<second target input shaft speed $N_{in\_b}^*$".

The respective target speed ratios $\gamma_{tgt\_a}$, $\gamma_{tgt\_b}$, $\gamma_{tgt\_c}$ are determined, according to the corresponding target input shaft speeds $N_{in\_a}^*$, $N_{in\_b}^*$, $N_{in\_c}^*$ determined as described above. Namely, the relationship among the target speed ratios corresponds to the relationship ($N_{in\_a}^*$<$N_{in\_c}^*$<$N_{in\_b}^*$) of the target input shaft speeds. In FIG. 9, a broken line indicates a first target speed ratio $\gamma_{tgt\_a}$ at the time of "accelerator-ON" return, and a one-dot chain line indicates a second target speed ratio $\gamma_{tgt\_b}$ at the time of "brake-ON" return, while a two-dot chain line indicates a third target speed ratio $\gamma_{tgt\_c}$ at the time of other returns.

More specifically, the first target speed ratio $\gamma_{tgt\_a}$ at the time of "accelerator-ON" return is smaller (high-gear side) than the second target speed ratio $\gamma_{tgt\_b}$ at the time of "brake-ON" return, and the third target speed ratio $\gamma_{tgt\_c}$ at the time of other returns. The second target speed ratio $\gamma_{tgt\_b}$ at the time of "brake-ON" return is larger (low-gear side) than the third target speed ratio $\gamma_{tgt\_c}$ at the time of other returns. Thus, the respective target speed ratios are set so as to satisfy a relationship that "first target speed ratio $\gamma_{tft\_a}$<third target speed ratio $\gamma_{tgt\_c}$<second target speed ratio $\gamma_{tgt\_b}$".

The downshift amount (the amount of increase of the speed ratio $\gamma$ of the CVT 5) at the time of return from free running is smallest when the target speed ratio $\gamma_{tgt}$ is set to the first target speed ratio $\gamma_{tgt\_a}$. Thus, the length of time it takes for the speed ratio $\gamma$ of the CVT 5 at the time of "accelerator-ON" return to reach (be changed to) the first target speed ratio $\gamma_{tgt\_a}$ can be reduced, and the length of time it takes to complete engagement of the second clutch C2 can be reduced.

As explained above, according to the vehicle control system of this modified example, downshift control can be performed so as to achieve the target speed ratio suitable for vehicle conditions after the vehicle returns from free running to normal traveling. Thus, the driver is less likely or unlikely to feel strange or uncomfortable when the vehicle returns from free running.

The disclosure is not limited to the embodiment and modified example as described above, but may be changed as needed without departing from the object of this disclosure.

In the above-described embodiment and modified example, the first path and the second path serving as power transmission paths are formed in parallel with each other in the power train. However, the disclosure is not limited to this arrangement. The vehicle to which the subject matter of this disclosure is applied is only required to have a clutch provided between the continuously variable transmission and the drive wheels, for disconnecting the engine from the drive wheels.

The shift control at the time of return from free running is not limited to downshift control, but may be upshift control. For example, if the vehicle coasts along a downhill when the speed ratio of the CVT 5 at the start of free running is larger than the minimum speed ratio, the vehicle speed at the time of return becomes higher than the vehicle speed at the start of free running. In this case, upshift control of the CVT 5 may be performed at the time of return from free running.

What is claimed is:

1. A control system of a vehicle, comprising:
an engine;
a continuously variable transmission;
drive wheels that receive drive power from the engine via a power transmission path that extends through the continuously variable transmission;
a clutch provided downstream of the continuously variable transmission so as to be provided between the continuously variable transmission and the drive wheels in the power transmission path; and
an electronic control unit configured to
release the clutch and stop the engine when a predetermined execution condition is satisfied during traveling such that the vehicle enters a coasting mode,
keep the continuously variable transmission at a speed ratio established when the vehicle enters the coasting mode,
restart the engine and perform a downshift of the continuously variable transmission when a predetermined return condition is satisfied during the coasting mode, and
engage the clutch after the downshift is started such that the vehicle exits the coasting mode.

2. The control system of the vehicle according to claim 1, wherein the electronic control unit is configured to:
shift the continuously variable transmission using a vehicle speed and an input shaft speed of the continuously variable transmission as parameters of a shift map;
set a speed ratio, at which the input shaft speed is larger than a predetermined value at the vehicle speed detected when the return condition is satisfied, as a target speed ratio based on the vehicle speed detected when the return condition is satisfied and the shift map; and
perform the downshift so as to increase the speed ratio of the continuously variable transmission toward the target speed ratio.

3. The control system of the vehicle according to claim 2, wherein:

the return condition includes a case where an accelerator pedal is depressed, and a case where a brake pedal is depressed; and
the electronic control unit is configured to set the target speed ratio such that the target speed ratio, in the case where the accelerator pedal is depressed, is smaller than the target speed ratio, in the case where the brake pedal is depressed.

4. The control system of the vehicle according to claim 2, wherein the electronic control unit is configured to engage the clutch when a difference between the speed ratio of the continuously variable transmission, which is increased due to the downshift, and the target speed ratio is equal to or smaller than a predetermined threshold value.

5. The control system of the vehicle according to claim 1, wherein the electronic control unit is configured to start the downshift after the engine that is restarted is brought into a self-operating state.

6. The control system of the vehicle according to claim 1, wherein:
the clutch includes a hydraulic actuator;
the hydraulic actuator is configured to frictionally engage engaging elements of the clutch; and
the electronic control unit is configured to control a hydraulic pressure of the hydraulic actuator, during downshift of the continuously variable transmission, such that the hydraulic pressure becomes equal to a pressure level that is higher than zero, and is within a range in which the clutch does not produce a transmission torque capacity.

7. The control system of the vehicle according to claim 1, wherein the continuously variable transmission includes a primary pulley which rotates with an input shaft, a secondary pulley that rotates with a secondary shaft, and a belt that is wrapped around V grooves in the primary and secondary pulleys, and
wherein the clutch is provided between the secondary shaft and an output shaft, the clutch being operable to selectively disconnect the continuously variable transmission from the output shaft.

8. The control system of the vehicle according to claim 7, further comprising a counter gear mechanism including a counter driven gear and a counter drive gear,
wherein an output gear is mounted on the output shaft, the output gear meshing with the counter driven gear, and
wherein the counter drive gear meshes with a ring gear of a differential gear unit, the drive wheels being connected to the differential gear unit via axles.

* * * * *